(12) United States Patent
Myllynen et al.

(10) Patent No.: US 8,099,079 B2
(45) Date of Patent: Jan. 17, 2012

(54) METHOD AND SYSTEM FOR DISTRIBUTING DATA TO MOBILE DEVICES

(75) Inventors: Harri Myllynen, Helsinki (FI); Pasi Leino, London (GB); Antti Ohrling, London (GB)

(73) Assignee: Apple Inc., Cupertino, CA (US)

( * ) Notice: Subject to any disclaimer, the term of this patent is extended or adjusted under 35 U.S.C. 154(b) by 522 days.

(21) Appl. No.: 10/571,709

(22) PCT Filed: Sep. 13, 2004

(86) PCT No.: PCT/GB2004/003890
§ 371 (c)(1),
(2), (4) Date: Mar. 2, 2007

(87) PCT Pub. No.: WO2005/025252
PCT Pub. Date: Mar. 17, 2005

(65) Prior Publication Data
US 2007/0202922 A1    Aug. 30, 2007

(30) Foreign Application Priority Data
Sep. 11, 2003 (GB) .................................. 0321337.8

(51) Int. Cl.
*H04M 1/66* (2006.01)
(52) U.S. Cl. ...... 455/411; 455/418; 455/566; 705/14.73
(58) Field of Classification Search .................. 370/338, 370/349, 331; 455/412, 414, 422, 452, 445, 455/435, 466, 433, 456, 566; 701/211, 207, 701/209; 705/14, 26, 25; 709/218, 230, 709/227, 229, 225

See application file for complete search history.

(56) References Cited

U.S. PATENT DOCUMENTS 5,613,213 A    3/1997    Naddell et al.
(Continued)

FOREIGN PATENT DOCUMENTS

DE    19941461 A1    3/2001
(Continued)

OTHER PUBLICATIONS

Search Report under Section 17 dated May 20, 2008 issued by the British Patent Office in counterpart UK Application No. GB0807153.2.

(Continued)

*Primary Examiner* — Nick Corsaro
*Assistant Examiner* — Mahendra R Patel
(74) *Attorney, Agent, or Firm* — Novak Druce + Quigg LLP

(57) ABSTRACT

A method and system for distributing mobile applications includes receiving, processing and displaying advertisements on mobile terminals. Data is visualized on a display area of a mobile terminal that receives process data including an executable process. The mobile terminal receives a visualization request from the process; selects data in accordance with the visualization request; and displays the selected data the display area. Execution of at least part of the executable process is paused until the visualization process has completed. Thus mobile terminals process an executable process which makes calls for data to be displayed to a user. The displayed data may be advertisement data selected based on user preferences. The executable process may be a game which is paused at a particular level to display the data. The executable process might also be a news relaying application to retrieve and display news stories.

19 Claims, 5 Drawing Sheets

U.S. PATENT DOCUMENTS

| | | | |
|---|---|---|---|
| 5,697,844 A * | 12/1997 | Von Kohorn | 463/40 |
| 5,892,451 A | 4/1999 | May et al. | |
| 5,978,775 A | 11/1999 | Chen | |
| 5,978,833 A | 11/1999 | Pashley et al. | |
| 6,009,458 A * | 12/1999 | Hawkins et al. | 709/203 |
| 6,222,925 B1 | 4/2001 | Shiels et al. | |
| 6,334,145 B1 | 12/2001 | Adams et al. | |
| 6,338,044 B1 | 1/2002 | Cook et al. | |
| 6,438,557 B1 * | 8/2002 | Dent | 707/102 |
| 6,646,657 B1 | 11/2003 | Rouser | |
| 6,718,551 B1 | 4/2004 | Swix et al. | |
| 6,816,724 B1 | 11/2004 | Asikainen | |
| 7,174,309 B2 | 2/2007 | Niwa | |
| 7,455,590 B2 | 11/2008 | Hansen et al. | |
| 7,492,371 B2 | 2/2009 | Jeffrey et al. | |
| 2002/0002510 A1 | 1/2002 | Sharp et al. | |
| 2002/0004413 A1 | 1/2002 | Inoue | |
| 2002/0004743 A1 * | 1/2002 | Kutaragi et al. | 705/14 |
| 2002/0059379 A1 | 5/2002 | Harvey et al. | |
| 2002/0061743 A1 * | 5/2002 | Hutcheson et al. | 455/426 |
| 2002/0078006 A1 * | 6/2002 | Shteyn | 707/1 |
| 2002/0111177 A1 | 8/2002 | Castres | 455/466 |
| 2002/0128029 A1 * | 9/2002 | Nishikawa et al. | 455/517 |
| 2002/0138291 A1 | 9/2002 | Vaidyanathan et al. | |
| 2002/0164962 A1 * | 11/2002 | Mankins et al. | 455/99 |
| 2002/0174430 A1 * | 11/2002 | Ellis et al. | 725/46 |
| 2002/0183045 A1 | 12/2002 | Emmerson et al. | |
| 2003/0037068 A1 * | 2/2003 | Thomas et al. | 707/200 |
| 2003/0040297 A1 | 2/2003 | Pecen et al. | |
| 2003/0064757 A1 | 4/2003 | Yamadera et al. | |
| 2003/0083108 A1 | 5/2003 | King et al. | |
| 2003/0144022 A1 * | 7/2003 | Hatch | 455/550 |
| 2003/0163369 A1 * | 8/2003 | Arr | 705/14 |
| 2003/0182567 A1 | 9/2003 | Barton et al. | |
| 2003/0195039 A1 | 10/2003 | Orr et al. | |
| 2003/0197719 A1 | 10/2003 | Lincke et al. | |
| 2003/0203731 A1 | 10/2003 | King et al. | |
| 2004/0003398 A1 * | 1/2004 | Donian et al. | 725/34 |
| 2004/0032393 A1 * | 2/2004 | Brandenberg et al. | 345/156 |
| 2004/0032434 A1 | 2/2004 | Pinsky et al. | |
| 2004/0043790 A1 | 3/2004 | Ben-David et al. | |
| 2004/0045029 A1 | 3/2004 | Matsuura | |
| 2004/0045030 A1 * | 3/2004 | Reynolds et al. | 725/110 |
| 2004/0092248 A1 | 5/2004 | Kelkar et al. | |
| 2004/0137987 A1 | 7/2004 | Nguyen et al. | |
| 2004/0152518 A1 * | 8/2004 | Kogo | 463/42 |
| 2004/0198403 A1 | 10/2004 | Pedersen et al. | |
| 2004/0204133 A1 | 10/2004 | Andrew et al. | |
| 2004/0204145 A1 | 10/2004 | Nagatomo | |
| 2004/0233224 A1 | 11/2004 | Ohba | |
| 2004/0259526 A1 | 12/2004 | Goris et al. | |
| 2005/0033700 A1 | 2/2005 | Vogler et al. | |
| 2005/0050208 A1 | 3/2005 | Chatani | |
| 2005/0086697 A1 | 4/2005 | Haseltine | |
| 2005/0119936 A1 | 6/2005 | Buchanan et al. | |
| 2005/0125397 A1 | 6/2005 | Gross et al. | |
| 2006/0031164 A1 | 2/2006 | Kim | |
| 2006/0037039 A1 | 2/2006 | Aaltonen | |
| 2006/0075425 A1 | 4/2006 | Koch et al. | |
| 2006/0123014 A1 | 6/2006 | Ng | |
| 2006/0155732 A1 | 7/2006 | Momose et al. | |
| 2006/0168616 A1 | 7/2006 | Candelore | |
| 2006/0200460 A1 | 9/2006 | Meyerzon et al. | |
| 2006/0286963 A1 | 12/2006 | Koskinen et al. | |
| 2006/0286964 A1 | 12/2006 | Polanski et al. | |
| 2006/0288124 A1 | 12/2006 | Kraft et al. | |
| 2007/0074262 A1 | 3/2007 | Kikkoji et al. | |
| 2007/0100805 A1 | 5/2007 | Ramer et al. | |
| 2007/0113243 A1 * | 5/2007 | Brey | 725/32 |
| 2007/0202922 A1 | 8/2007 | Myllynen et al. | |

FOREIGN PATENT DOCUMENTS

| | | |
|---|---|---|
| EP | 0 831 629 A2 | 3/1998 |
| EP | 1043905 | 4/2000 |
| EP | 1 107 137 A2 | 6/2001 |
| EP | 1 109 371 A2 | 6/2001 |
| EP | 1 195 701 A1 | 4/2002 |
| EP | 1 633 100 A1 | 3/2006 |
| GB | 2 386 509 A | 9/2003 |
| GB | 2 414 621 A | 11/2005 |
| GB | 2 416 887 A | 2/2006 |
| GB | 2 424 546 A | 9/2006 |
| JP | 2002140272 | 5/2002 |
| KR | 20030049440 | 6/2003 |
| KR | 20060011760 A | 2/2006 |
| KR | 2007-011675 | 11/2007 |
| WO | WO 89/10610 | 11/1989 |
| WO | WO0070848 | 11/2000 |
| WO | WO 01/22748 A1 | 3/2001 |
| WO | WO0131497 | 5/2001 |
| WO | WO 01/57705 A1 | 8/2001 |
| WO | WO 01/65411 A1 | 9/2001 |
| WO | WO 01/71949 A1 | 9/2001 |
| WO | WO 02/09431 A2 | 1/2002 |
| WO | WO 02/35324 A2 | 5/2002 |
| WO | WO 02/50632 A2 | 6/2002 |
| WO | WO 02/069585 A2 | 9/2002 |
| WO | WO 02/086664 A2 | 10/2002 |
| WO | WO02100121 | 12/2002 |
| WO | WO03015430 | 2/2003 |
| WO | WO 03/019913 A1 | 3/2003 |
| WO | WO 03/024136 A1 | 3/2003 |
| WO | WO2004057578 | 7/2004 |
| WO | WO2004093044 | 10/2004 |
| WO | WO 2005/020578 A1 | 3/2005 |
| WO | WO 2005/029769 A1 | 3/2005 |
| WO | WO 2006/119481 | 11/2006 |
| WO | WO 2008/024852 A2 | 2/2008 |

OTHER PUBLICATIONS

European Search Report dated Mar. 19, 2008 issued by the European Patent Office in counterpart European Application No. EP 07 11 8601.

European Search Report dated Jul. 18, 2008 issued by the European Patent Office in related EPO Application No. EP 08 15 3656.

European Search Report dated Jul. 18, 2008 issued by the European Patent Office in related EPO Application No. EP 08 15 3658.

European Search Report dated Jul. 22, 2008 issued by the European Patent Office in related EPO Application No. EP 08153651.8.

European Search Report dated Jul. 23, 2008 issued by the European Patent Office in related EPO Application No. EP 08153654.2.

European Search Report dated Nov. 5, 2008 issued in counterpart European Patent Application No. EP 08159331.1.

European Examination Report dated Nov. 3, 2008 issued in counterpart European Patent Application No. EP 08159331.1.

European Search Report dated Nov. 5, 2008 issued in counterpart European Patent Application No. EP 08159333.7.

European Examination Report dated Nov. 3, 2008 issued in counterpart European Patent Application No. EP 08159333.7.

Communication Pursuant to Article 94(3) EPC dated Feb. 10, 2009, issued by the European Patent Office in related European Patent Application No. 07 118 601.9 (3 pages).

Office Action dated Apr. 6, 2009 issued in related U.S. Appl. No. 12/156,335 (17 pages).

Communication Pursuant to Article 94(3) EPC issued Jun. 25, 2009 in corresponding European Patent Application No. 08 159 331.1 (3 pages).

Office Action issued from the U.S. Patent and Trademark Office dated Aug. 14, 2009 issued in related U.S. Appl. No. 12/431,961 (12 pages).

English translation of First Office Action issued by State Intellectual Property Office of the People's Republic of China dated Dec. 4, 2009 in related Chinese Application No. 200480033236.X (8 pages).

Office Action issued by U.S. Patent Office dated Mar. 22, 2010, issued in related U.S. Appl. No. 12/431,961 (19 pages).

Office Action issued Apr. 22, 2010 in related U.S. Appl. No. 12/156,335 (16 pages).

Office Action issued from the U.S. Patent and Trademark Office dated Nov. 4, 2010 issued in related U.S. Appl. No. 12/431,961 (21 pages).

* cited by examiner

METHOD AND SYSTEM FOR DISTRIBUTING DATA TO MOBILE DEVICES

FIELD OF THE INVENTION

The present invention relates to a method and a system for distributing mobile applications and is suitable particularly, but not exclusively for receiving, processing and displaying advertisements on mobile terminals.

BACKGROUND OF THE INVENTION

Currently the Short Message Service (SMS) is the medium of choice for personal messaging. In addition to personal messaging, several companies have designed systems that are intended to include advertisement information in SMS messages. For example, International patent application WO 03/015430 describes a service whereby advertisement data (including length of advertisement (number of characters), a preview of the advertisement and an identifier associated with the advertisement provided by external sources) are stored on mobile terminal in a "local" store, and the user selects an advert, from the store, to accompany an outgoing message. The terminal then calculates a length available for text, and the sender is allowed to enter a message having a length up to the calculated length. An outgoing message is then created, comprising the advertisement ID associated with the selected advertisement and the user's message text, and having a header indicating that the message has advertising content. The outgoing message is then sent from the terminal and received by the SMSC, which checks the header of the message; any message having an identifier corresponding to the advertisement type is passed to an "ad server". The ad server processes the message, effectively selecting an advertisement from a store, creating one or more messages that comprise the selected advertisement and creating an SMS message that can be read by the recipient's mobile phone terminal.

Despite the popularity of SMS messaging, wireless has not yet made its mark as an advertising medium. This is partly because each SMS message is limited to 160 characters, and these characters can only be selected from the ASCII set, which makes it difficult to include meaningful and catchy product information in the messages. As a result the ad server quite often creates a plurality of messages, which means that either the receiving terminal has to be equipped with some software that concatenates the messages together in some elegant manner (since presentation is very important with advertising), or the receiving terminal simply displays the messages separately, as is the case with non-modified SMS messages exceeding 160 characters in length. Since the success of the advertising industry is heavily reliant on the impression created by advertisements, and since SMS messages can only provide an extremely restricted visual impact, this means that, as an advertising medium, the SMS communication service is rather limited.

International patent application PCT/AU00/01296, published as WO0131497 describes delivering advertisement data wirelessly as video data. In one arrangement video data streams are unicast or multicast to individual subscribers, the subscribers having a corresponding player or decoder on their terminal for decoding and displaying the received streams. These video streams are described as e.g. live news, video-on-demand (VOD) provider etc., and the video advertising can include multiple video objects, which can be sourced separately. In one arrangement, a video advertisement object can be dynamically inserted into a video stream being delivered to the decoder, the nature of this insertion being controlled by control data embedded in the advert object. Alternatively an interactive video file can be downloaded, rather than streamed, to a device so that it can be viewed offline or online at any time. A downloaded video file has all of the interaction and dynamic media composition capabilities that are provided by the online streaming process and includes menus, advertising objects, and forms that register user selections and feedback. Whilst this is creates a significantly improved impression, from the point of view of perception of a product or service, video files (object or streamed data) require a significant amount of bandwidth and often taken an unacceptable amount of time to download to a mobile device.

An object of the present invention is to provide a convenient method of presenting information to a user of a mobile terminal.

SUMMARY OF THE INVENTION

According to a first aspect of the present invention there is provided a data visualization method for use in visualizing data on a mobile terminal, the mobile terminal comprising a display area and being adapted to receive process data comprising an executable process, the method comprising the steps of:
arranging for the mobile terminal to receive a visualization request from the executable process;
arranging for the mobile terminal to select data in accordance with the visualization request; and
arranging for the mobile terminal to perform a visualization process in which the selected data are displayed in the display area,
in which execution of at least part of the executable process is paused until the visualization process has completed.

Thus with embodiments of the invention, mobile terminals are configured to run an executable process whose operation can, at least in part, be interrupted, either under control of the executable process or under control of the mobile terminal, such that the process sends a visualization request to the mobile terminal. At this point, when at least part of the executable process is paused, control is essentially handed over from the executable process to the mobile terminal so that the mobile terminal can invoke a visualization process. Once the visualization process has been completed the mobile terminal can hand control back to the executable process so that it can resume processing. In one arrangement the mobile terminal transmits a message to the executable process indicating that the visualization process has been completed, thereby ending the pausing of the executable process.

In one embodiment the data are selected from a second, different, terminal, for example, one located remote from the mobile terminal and accessible therefrom via a radio link. Preferably the selecting step includes selecting data in accordance with preferences associated with the mobile terminal and/or the user of the terminal which will have previously been uploaded to the remote terminal.

In a preferred arrangement the data are retrieved from a store of advertisement data and the method includes displaying an advertisement image and a plurality of selectable items associated therewith, and monitoring for selection of one of said selectable items during pausing of the executable process. The advertisement image can be forwarded to a different mobile terminal in response to selection of a first item within the display area; the identity of the mobile terminal to which the image is forwarded can be selected from the list of contacts stored on the SIM of the mobile terminal or in a local store of contacts maintained by the mobile terminal itself.

In preferred embodiments the selected data comprise image and movement data specifying movement of an image with respect to the display area, and, when the executable process is paused, the mobile terminal is triggered to move the image over the display area on the basis of the movement data. Examples of movement data include rate of movement of an image across the display area; rate of movement of the image longitudinally over the display area; and a size of the image relative to size of the display area.

In at least one embodiment the application is a game and the game is paused when the game reaches a particular level. In another embodiment the executable process might be a news-relaying application configured to retrieve and display news stories.

According to another aspect of the present invention there is provided a mobile terminal configured to process the method described hereinabove, and to cooperate with a distributed system arranged to transmit data in response to requests therefore.

According to a further aspect of the present invention there is provided a method of controlling operation of a mobile terminal, the mobile station comprising a processing system and a software component having a plurality of operational status associated therewith, each operational status being dependent on an execution state of the software component, the method comprising the steps of:

monitoring the software component so as to identify a change in operational status thereof;

in response to a predetermined change in operational status, issuing a request message, the request message including a request for user data associated with the mobile terminal;

arranging for the processing system to retrieve said user data and to transmit the same to an authentication system; and receiving data indicative of an unlocking code from said authentication system and arranging for said software component co-operate with the received unlocking code so as to change the operational status to a different operational status.

In embodiments of this further aspect of the invention, such a software component, preferably in the form of a software application, can be wirelessly distributed to mobile terminals. This aspect of the invention is particularly well suited when the application is a game, since trial versions of the game can, in the first instance, be transmitted to a terminal. In the event that the user indicates that he wishes to obtain access to the full version of the game the software component sends a signal indicative of this request to the mobile station, which sends a request to an authentication system. The authentication system might comprise a third party payment system or simply a subscriber database or similar. In response to an authenticated request—in the form of an unlocking code or the like—the software component changes its operational status so as to allow the user access to a full version of the game.

Features and advantages of the invention will become apparent from the following description of preferred embodiments of the invention, given by way of example only, which is made with reference to the accompanying drawings.

DETAILED DESCRIPTION OF THE INVENTION

Embodiments of the invention are concerned with distribution of advertisement data to mobile devices and interactive features of the distributed advertisement data. The invention has several aspects, including the way in which advertisement data is formatted; interactive content of advertisement data; embedding of advertisement data in applications such as games and the like; peer-to-peer distribution of advertisements and of applications arranged to display and run such advertisement data; and selection of message settings utilizing advertisement data. Details of these aspects will be described in detail later in the description, but first a description of the infrastructure needed to support the aspects will be presented.

Figure 1:
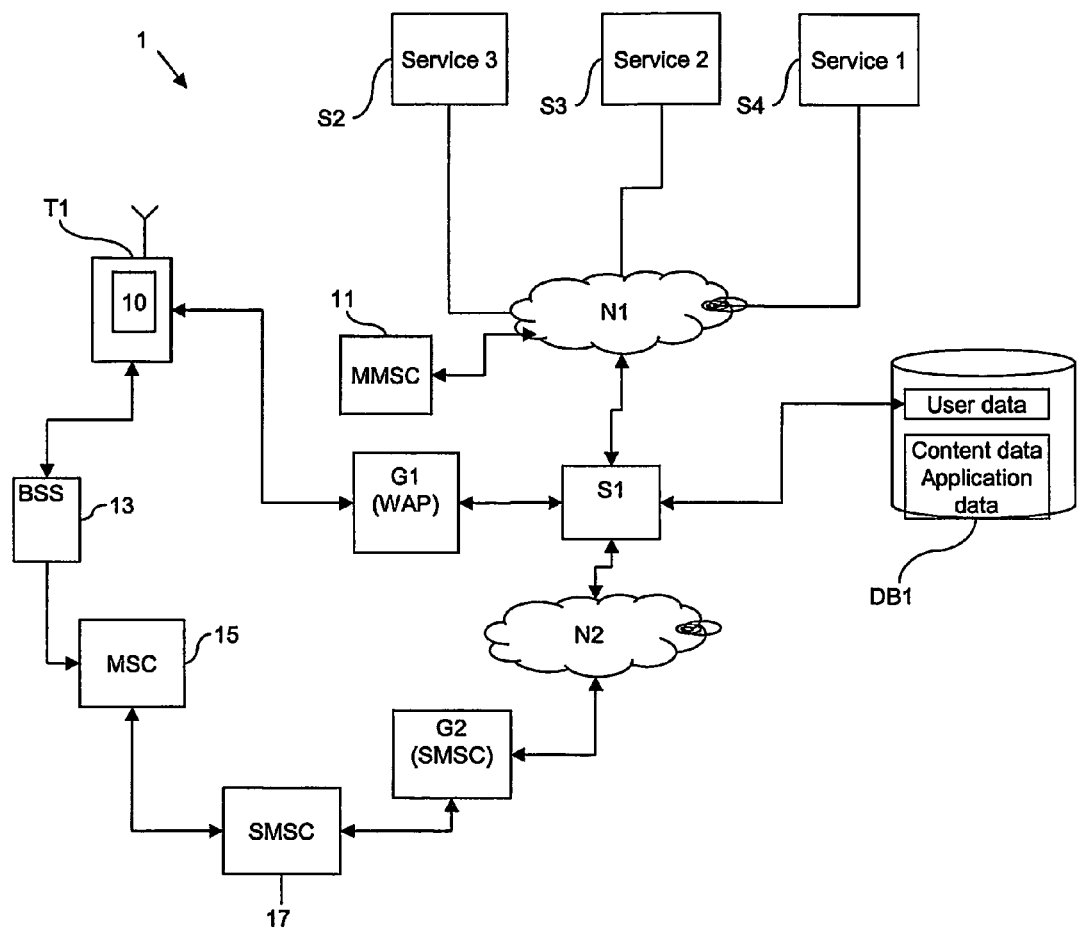
FIG. 1 is a schematic illustration of a mobile network arranged in accordance with an embodiment of the invention.

FIG. 1 shows an example of a data system 1 within which embodiments of the invention operate. In FIG. 1, the blocks indicate components of the data system 1. In the arrangement shown in FIG. 1, a terminal T1 communicates with various network devices within the data system 1. The terminal T1 may be a wireless terminal such as a mobile phone, a PDA or a Laptop computer that is configured to run an advertisement application 10 according to the invention, as will be described in more detail below.

The data system 1 comprises: a WAP gateway G1, which is typically a network operator's WAP gateway configured to send and receive signals over Bluetooth or GPRS; an advertisement services server S1, with which the advertisement application 10 communicates via the WAP gateway G1; an MMSC store and forward network node 11, which is managed by the network operator and arranged to control transmission of MMS messages between senders and recipients; Public Land Mobile Network (PLMN) radio and switching network infrastructure components identified as Base Station BSS 13 and MSC 15, together with an SMS store and forward network node 17 and gateway G2 which enables SMS messages to be transmitted from the mobile network PLMN to the server S1; and a database DB1, arranged to receive and store, from the advertisement services server S1, content data together with data in respect of subscribers and in respect of terminals such as T1. The data system 1 can also include network devices required to support communication via the GPRS communication service; for example, the data system 1 may include a Gateway GPRS Support Node (not shown), which is adapted to provide an interface between a GPRS network and external data networks (such as the Internet or private networks) receiving data packets from mobile devices, and forwarding them, in a known manner, through external networks.

The advertisement services server S1 is arranged to store and download content data such as news, sport and images, which have been sourced from third party content providers shown as S2, S3, S4 via Network N1, and application data such as object files, executable files and script files. The content and application data may be, or include, advertisement data, as will be described in more detail below, and is typically sent to the server S1 over a TCP/IP link. In addition to receiving IP packets from servers S2, S3 and S4, the server S1 is configured to deploy data and WAP applications to mobile terminals such as T1 over a Bluetooth link. Accordingly the WAP services server S1 can be accessed by the terminal T1, either directly by the advertisement application 10 or in response to input from the user of terminal T1. In addition, the server S1 is arranged to receive and store (in database DB1) demographic information relating to subscribers of the data service, which can be used in selection of appropriate content and application data.

Figure 2:
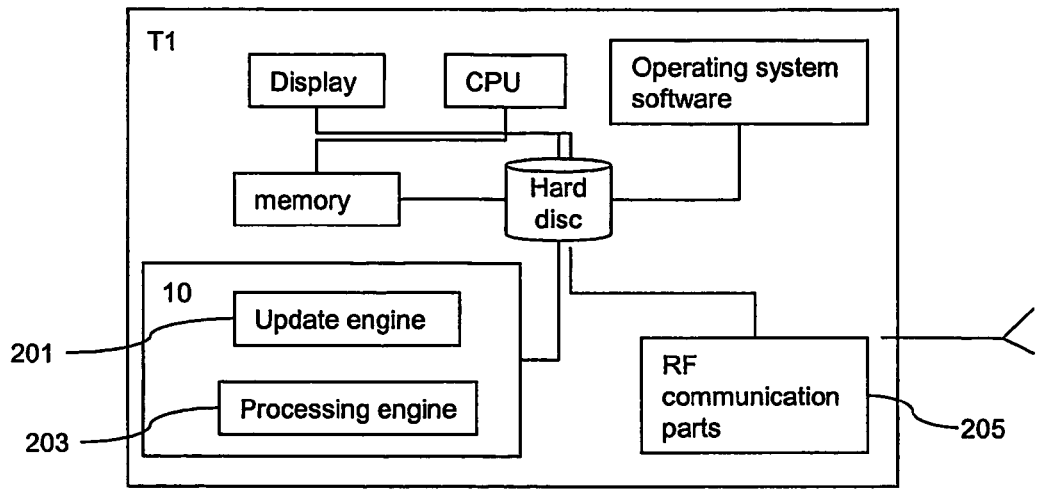
FIG. 2 is a block diagram showing components of, and arranged to execute on, the terminal T1 shown in FIG. 1.

Aspects of the advertisement application 10 will now be described in more detail. FIG. 2 is a schematic diagram showing an embodiment of an advertisement application 10 according to the invention. The application 10 can be distributed to terminal T1 using peer-to-peer methods (i.e. from other terminals) or downloaded from the server S1, via Bluetooth or GPRS communication services, or stored on a memory card associated with the terminal T1 or on the SIM card associated with the terminal T1. The advertisement application 10 is preferably a native application, i.e. written in a low level computer language that is compiled to run directly by the CPU of terminal T1 (e.g. C or C++), or a Java™ application, in which case the terminal T1 also includes a Java virtual machine (JVM)/Java runtime arrangement capable of running the advertisement application 10 as an application-level software environment.

In one embodiment, the advertisement application 10 includes an initialization process, which, when the advertisement application 10 is invoked for the first time, requests certain demographic information from the subscriber. For example, the initialization process can display a form having several fields therein such as identity, age, sex, interests etc., which the subscriber has to complete for the application to become fully operational. Once the user has entered data into these fields, the initialization process inserts the data into one or more messages. The messages can be embodied as SMS messages, in which case they are transported to the server S1 via BSS 13, MSC 15, SMSC 17 and G2, or as WAP packets and transported to the server S1 via G1 using WAP over Bluetooth (or GPRS). In response, and provided the data sent comprises sufficient information, the server S1 transmits an unlocking code, which automatically unlocks the application 10, making it fully operational.

The advertisement application 10 comprises an update engine 201 and a processing engine 203, the update engine 201 being arranged to send data indicative of subscriber settings and advertisement selection to the server S1. Preferably the update engine 201 communicates with the server S1 periodically (e.g. daily), uploading the subscriber's settings and advertisement selections for the forthcoming period. The processing engine 203 is arranged to process application data such as games, and content data such as images, news and sports, which have been received from the server S1 (or from other remote services). In addition, the processing engine 203 is arranged to process advertisement data, which, in one embodiment are sent as SMS or MMS messages, but could alternatively be sent as data packets via GPRS or Bluetooth.

Figure 3:
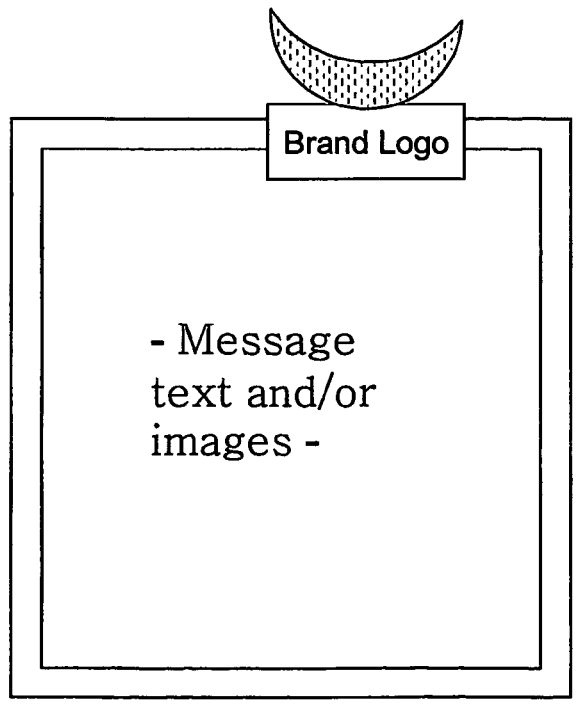
FIG. 3 is a schematic illustration of a message presentation setting specified by one of the components shown in FIG. 2.

The update engine 201 is arranged to display various message presentation settings to the subscriber, which can be modified to enable the user to select his preferred settings. Presentation settings that can be modified include a frame around messages, font of messages, and orientation and positioning of text and graphics and the like within and around the message, and an example is shown in FIG. 3. Once the subscriber has entered his preferred settings, the update engine 201 transmits a file including the settings information to the server S1, which stores the settings in the database DB1, for use in modifying messages subsequently sent by the user (as will be described in more detail below).

The processing engine 203 is configured to request and receive content data, advertisement data, executable files and/or object files from the server S1 (or other remote servers), and to process the received data and files. In the case of content data (e.g. news and sports), the processing engine 203 is arranged to display the content, embedding advertisement data therein. The advertisement data could, for example, be inserted between news stories, whenever certain keywords appear, in accordance with predetermined settings that accompany the content data, or at random. The advertisement data are preferably sent with the content data, and include an identifier (herein referred to as advertisement ID) which identifies the subject matter of the advert. Advertisements, and hence the subject matter thereof, are preferably selected by the server S1 in accordance with the type of content data and the subscriber's settings.

In the case of executable files and/or object files, these are downloaded to the terminal T1 and invoked by the processing engine 203. The files can be downloaded on demand, or in accordance with previously specified conditions, in which case the advertisement application 10 may include a socket connection arranged to listen for data and, in response to receipt thereof, to pass the received data onto the processing engine 203. The executable files can include games, more specifically trial games, which include real-time calls for visualization of data; in one arrangement and in use, the games include real-time calls between levels of the game.

Figure 4A:
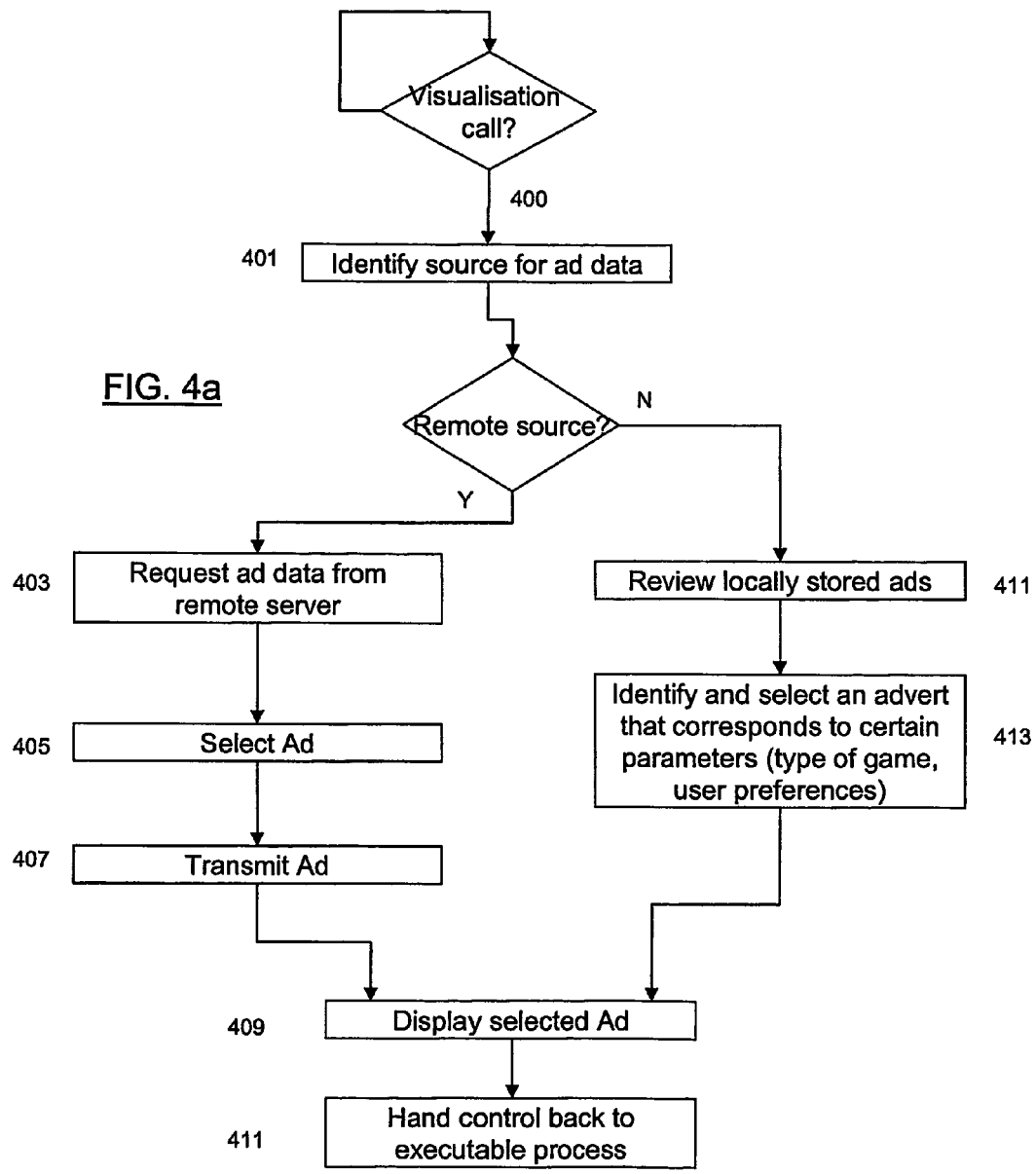
FIG. 4a is a flow diagram showing steps involved in an aspect of the invention concerning embedding advertisement data into applications running on the terminal shown in FIG. 1.

Aspects of the invention that relate to processing and serving visualization requests will now be described with reference to FIG. 4a. The processing engine 203 receives a visualization request from the executable process, the request having been invoked either in response to a command issued by the processing engine 203 or autonomously generated by the executable process itself (step 400). Having sent the visualization request, operation of at least part of the executable process is paused, and control is handed over to the processing engine 203. In response to receipt of the visualization request, the processing engine 203 identifies (step 401) whether the call specifies that data should be retrieved from a remote source. If the request specifies a remote source, the processing system 203 sends (step 403) a request to server S1, preferably via the WAP gateway G1, for advertisement data. The request may include certain parameters, such as type of process etc., and the server S1 responds by selecting (step 405) an advertisement in accordance with the settings of the subscriber (retrievable from the database DB1) and those parameters (if any) included in the request. The selected advertisement is then transmitted (step 407) to the terminal T1, and upon receipt thereof the processing engine 203 displays the advertisement (step 409). Having displayed the advertisement the processing engine 203 sends an instruction to the executable process (step 411), causing it to resume whichever processing step was paused at step 400. Resuming processing when the executable process is a game might, for example, involve moving onto the next level in the game.

Alternatively the processing engine 203 could select one of the advertisements that has previously been transmitted to, and hence stored on, the terminal T1; for example, if the subscriber has recently received news data (and advertisement data with the news data), the processing system 203 could review (step 411), by means of advertisement ID associated with advertisement data, those advertisements already stored on the terminal T1, with a view to identifying (step 413) an advertisement that matches the subscriber preferences and/or indeed the type of executable process. Of course, in the event that none of the local advertisements is relevant to the preferences, the processing engine 203 can retrieve advertisements from the remote store, following steps 403, 405, 407. As a further alternative, and when the executable process is a game, when the processing engine 203 first invokes the trial game, it can, firstly, identify types of advertisements that are to be displayed between levels. The processing engine 203 then sends a request to the server S1, as per step 403, but in this variant the request is for all of the advertisements that could be displayed at any point in the game (e.g. various levels). The server selects (as per step 405) relevant advertisements and transmits them (as per step 407) to the terminal T1. Then, when the trial game makes a call for an advertisement to be displayed, the processing engine 203 can select one of the adverts that was transmitted at step 407 on the basis of the subject matter and level of the game and the subject matter of an advertisement (as identifiable from the associated advertisement ID) in addition, or as an alternative, to the user's preferences. An advantage of this variant is that selection of relevant advertisement data will incur minimum time delay, for cases where the executable process is a game this embodiment will present a minimal interruption to operation of the trial game.

Figure 4B:
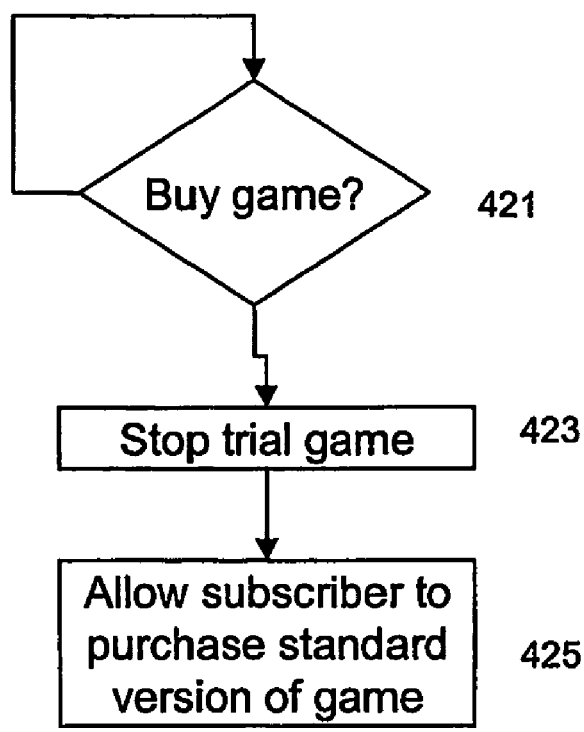
FIG. 4b is a flow diagram showing further steps involved in an aspect of the invention concerning applications running on the terminal shown in FIG. 1.

For the case where the executable process is a game, and referring to FIG. 4b, the game can include a "select game" function, which, if invoked (step 421), causes the processing engine 203 to halt the trial game (step 423) and retrieve (step 425) the standard version of the game (i.e. without adverts). Alternatively, the game could comprise an executable portion that, during execution of the trial game, is locked. In this variant step 425 could involve retrieving an unlocking code. Once the unlocking code has been received the processing engine 203 could apply the received unlocking code to the game, thereby allowing the user full access thereto.

Step 425 may additionally include performing certain transaction-related steps, such as requesting payment details from the subscriber, which, if entered, are preferably encapsulated within SMS messages and forwarded to the advertiser, via server BSS 13, MSC 15, SMSC 17, G2 and advertisement services server S1. In the event that the advertisement data selected at step 405 (or 413) are related to the game, they could include data which, when visualized, comprise selectable items that are configured to enable the user to select different versions of the game.

In some cases the advertisement data include an image file and a script file, the script file including control instructions for controlling how an image is to be displayed. In one arrangement the control instructions include movement instructions, specifically panning instructions controlling how an image moves across or around the display, and the rate at which the image is to be moved across the display. An example of a script file that controls movement of a football bouncing across the screen is set out below (image files here are "whitescreen.jpg","anim_nike_logo.jpg","anim_nike_football.jpg"):

```
        NAME       NIKE // 4 letter ID
    #include "m1anim.rh"
    RESOURCE ANIMATION {
        ad_duration_milliseconds = 4000;
        campaign_name = "Nike";
        advertisement_name = "Nike Football";
        image_files = { "whitescreen.jpg", "anim_nike_logo.jpg",
```

-continued

```
            "anim_nike_football.jpg" };
        effects = {
    IMAGE_EFFECT {
    image_file_no = 2;
    on_off_points = { 200, 2500 };
    top_left = {
    CP_2_LONG {type = 2; time = 200; x = -55; y = 0; },
    CP_2_LONG {type = 2; time = 800; x = 121; y = 0; },
    CP_2_LONG {type = 2; time = 1400; x = 0; y = 154; },
    CP_2_LONG {type = 2; time = 1800; x = 121; y = 154; },
    CP_2_LONG { type = 2; time = 2200; x = 60; y = 77; }
    };
    size = {
    CP_2_LONG { x = 55; y = 54; }
    };
    source_pos = {
    CP_2_LONG { x = 0; y = 0; }
    };
        },
    IMAGE_EFFECT {
    image_file_no = 1;
    on_off_points = { 2000 };
    top_left = {
    CP_2_LONG { time = 2200; x = 11; y = 208; },
    CP_2_LONG { time = 2700; x = 11; y = 170; }
    };
    size = {
    CP_2_LONG { x = 153; y = 28; }
    };
    source_pos = {
    CP_2_LONG { x = 0; y = 0; }
    };
        },
    IMAGE_EFFECT {
    image_file_no = 0;
    on_off_points = { 0, 4000 };
    top_left = {
    CP_2_LONG { type = 0; time = 0; x = 0; y = 0; },
    CP_2_LONG { type = 0; time = 200; x = 176; y = 0; },
    CP_2_LONG { type = 0; time = 3500; x = 0; y = 0;}
    };
    size = {
    CP_2_LONG { x = 176; y = 212; }
    };
    source_pos = {
    CP_2_LONG { x = 0; y = 0; }
    };
        },
    FADE_EFFECT {
    fade_no = 0;
    on_off_points = { 0, 200 };
    fade_data = {
    CP_2_LONG { time = 0; x = 255; y = 0; },
    CP_2_LONG { time = 200; x = 0; y = 0; },
    CP_2_LONG { time = 201; x = 255; y = 0; }
    };
        },
    FADE_EFFECT {
    fade_no = 1;
    on_off_points = { 3000, 4000 };
    fade_data = {
            CP_2_LONG { time = 3000; x = 255; y = 0; },
    CP_2_LONG { time = 3500; x = 0; y = 0; },
    CP_2_LONG { time = 4000; x = 255; y = 0; }
    };
            }
        };
    }
```

Known systems, such as that described in international patent publication number WO01031497, include means for sending advertisements that move dynamically across the screen; however, these moving images are embodied as compressed video files, which occupy a considerable amount of bandwidth. An advantage of this aspect of the invention is that, since the moving images are embodied as a combination of an image file and a script file, they occupy far less bandwidth.

Preferably the advertisement image file includes a selectable portion (such as a drop down menu or a button), which, when selected, displays one or more options. These options can include "forwarding" the advertisement to another subscriber, which causes the processing engine 403 to create an MMS message comprising the advertisement data; displaying another page with more information based on the already downloaded script and image file contents; accessing the web site of the company associated with the advertisement; and/or sending a request for further information to the company associated with the advertisement. If the latter option is selected, the request is sent to the advertiser (via server S1), which selects data in accordance with the request and inserts the selected data into a standard mobile phone form, transmitting the form to the terminal T1 as an encoded SMS message or as a WAP data packet (via Bluetooth or GPRS).

Figure 5:
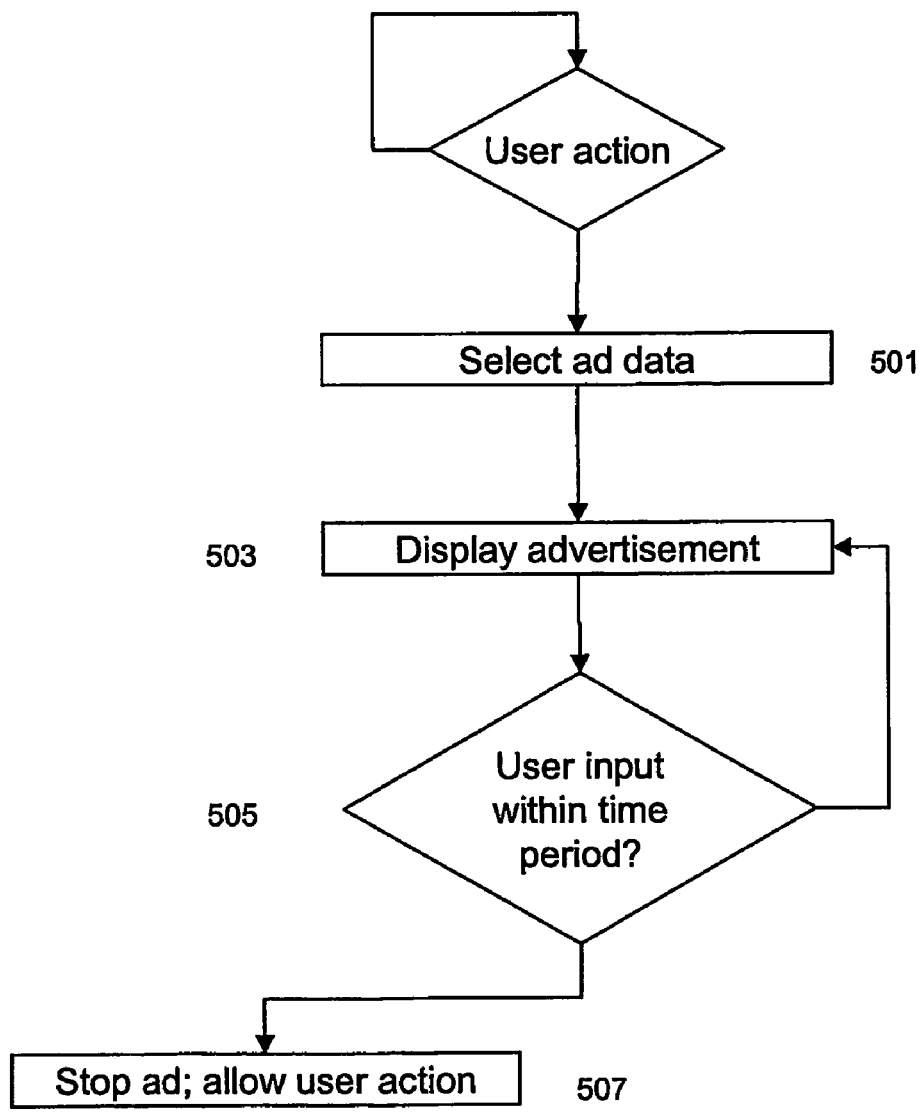
FIG. 5 is a flow diagram showing steps involved in an aspect of the invention concerned with displaying advertisements distributed to a mobile terminal via the mobile network shown in FIG. 1.

Referring now to FIG. 5, in a further aspect, the processing engine 203 could be arranged to invoke advertisement data whenever a user performs certain actions. Such actions include creating a new message, receiving and reading a message, accessing a web site, requesting data etc. This aspect will now be described for the example of creating a message; at step 501, in response to the subscriber creating a new message using a messaging application running on the mobile terminal, the processing engine 203 interrupts the messaging application and selects advertisement data, e.g. based on the time of day and/or the location of the subscriber, and displays the selected advertisement on the terminal (step 503). To facilitate this aspect of the invention the advertisement application 10 ensures that a minimum amount of advertisement data is stored on the terminal T1 at all times and refreshes the data periodically (typically every day, but the timescales could be either shorter or longer depending on the type of advertisement).

In some arrangements the advertisement application 10 can be configured so that the subscriber can only continue with his intended action if he interacts with the terminal T1 within a particular time period. This time period overlaps with the time during which advertisement data are displayed. When the advertisement data relate to a moving image, this aspect of the invention is particularly useful, since, in the event that the subscriber fails to interact with the terminal within the time period the application 10 can simply play the advertisement again. The visualization step 503 is repeated until the subscriber successfully interacts with the terminal within the time period (steps 505, 507), following which the messaging application running on the mobile terminal is enabled, by the processing engine 203, to resume processing once again.

From the point of view of advertising, an advantage of this aspect of the invention is that subscribers are forced to pay attention to the advertisement data if they wish to interact with their terminal T1. However, in order to minimize inconvenience to the user the time period within which user input is monitored should be reasonably short; for example, if the advertisement data are displayed once every 5 seconds, the time period could last for 3 seconds and occur within the middle of the advertisement.

As described above, the update engine 201 is arranged to send message presentation settings to the server S1. These presentation settings are subsequently used by the server S1 during a message modification process, whereby SMS, MMS or email messages, which are sent from one subscriber to another subscriber, are modified to include advertisement data. In addition to appending advertisement data to messages, the message modification process involves using the presentation settings to modify the way in which messages are presented on a screen, effectively customizing both the content and the presentation of messages. For outgoing MMS messages to be modified in this manner, outgoing messages have to be routed to the server S1 in the first instance. Once received by the server S1, the server S1 modifies messages—e.g. by selecting and appending an advertisement to the message in accordance with subscriber data stored in the database DB1, and/or by modifying the presentation of the message in accordance with the settings data transmitted by update engine 201. In the event that the settings data include data specifying preferred types of advertisements, selection of an advertisement is additionally dependent on these preferences. A notable feature of this aspect of the invention is that message settings and advertisement preferences are not transmitted together with the message, but are transmitted separately, by the update engine 201, as described above. An advantage of this aspect of the invention is that, for a given time period, advertisement preferences only have to be sent once rather than each time a message is created. It should be noted that those MMS messages that themselves comprise advertisement data—e.g. having been forwarded from terminal T1 in response to selection of an option presented to the user of terminal T1 as described above—are preferably not modified by the server S1. Those MMS messages that comprise such forwarded advertisements can have data in their header portion identifying the MMS message as an advertisement-type message. Accordingly, to differentiate between MMS messages that should be modified and messages that should not be modified the server S1 is arranged to initially review the headers of the received MMS message. In the event that one or more headers of the MMS message are identified to relate to advertisement data the message is not modified, but is instead transmitted directly to the network operator's MMSC 11.

If a message has been modified by the server S1 to include advertisement data, the server S1 transmits the message to the network operator's MMSC 11 for transmission to the recipient of the message (in accordance with conventional methods). In an alternative implementation, the data system 1 can include a proxy MMSC (not shown), in which case the terminal settings could be modified such that all messages are sent to the proxy MMSC in the first instance. The update engine 201 would then transmit the message settings (presentation and advertisement) to the proxy MMSC instead of to the server S1. In this variant the proxy MMSC would include the selecting and modifying functionality described above, and be arranged to forward the modified messages to the operator's MMSC 11 as described above.

A particularly convenient use for embodiments of the invention is in public venues such as festivals, shows and the like, since embodiments can be used to distribute venue-specific information transparently to mobile terminals associated with attendees of the festival. Several application servers such as server S1 could be located at various points within the venue and the server S1 be arranged to transmit application, advertisement and content data wirelessly to the terminals. Preferably the data are transmitted using Bluetooth, since this provides a convenient and location dependent means of controlling content delivery. Each such server S1 could be arranged to access a database DB1, the content of which has preferably already been updated to store advertisement data relating to the sponsors of the event; in addition third party servers, such as S2, S3, S4 could upload data to the database DB1 and server S1 by sponsors of, and during, the event. Mobile terminals entering the vicinity of server(s) S1 could receive application 10, wirelessly, together with data to be invoked and displayed by the application 10 and alert the user of the mobile terminal as to various products, services and demonstrations on offer within the venue. Other possible uses of embodiments of the invention include airports, retail stores (in particular supermarkets), libraries and the like.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A data visualization method for use in visualizing data on a mobile terminal, the mobile terminal comprising a display area and being adapted to receive process data comprising an executable process, the method comprising:
   executing the executable process in the mobile terminal, the executable process comprising a game;
   generating by the executable process, a visualization request, wherein the visualization request is autonomously generated by the executable process without a request from a user of the mobile terminal;
   receiving by an application in the mobile terminal the visualization request from the executable process executed in the mobile terminal, the application in the mobile terminal comprising an advertising application;
   pausing the executable process in response to sending the visualization request while the visualization request is being fulfilled by the application in the mobile terminal;
   selecting data by the application in the mobile terminal in accordance with the visualization request; and
   performing a visualization process by the application in the mobile terminal based upon the visualization request in which the selected data are displayed in the display area, wherein execution of the executable process is resumed when the visualization request has been fulfilled, the visualization process comprising displaying an advertisement image and a plurality of selectable items associated therewith, and monitoring for selection of one of said selectable items during said step of pausing the executable process,
   wherein the selecting data by the application in the mobile terminal in accordance with the visualization request comprises selecting data in accordance with preferences associated with the mobile terminal which comprise previously stored preference data associated with a user of the mobile terminal.

2. The method according to claim 1, wherein the method is performed on said mobile terminal and data are selected from a remote terminal.

3. The method according to claim 1, wherein the game comprises a plurality of levels, and said game issues a visualization request upon completion of a level.

4. The method according to claim 1, wherein said executable process is adapted to display content received from an information source.

5. The method according to claim 4, wherein said content comprises a plurality of information items and said process is configured to issue a visualization request between the display of individual items.

6. The method according to claim 1, further comprising forwarding the advertisement image to a different mobile terminal in response to selection of a first item.

7. The method according to claim 1, further comprising sending a request to a service associated with the advertisement image in response to selection of a first item.

8. The method according to claim 1, wherein the movement data specify a rate of movement of the image across the display area.

9. The method according to claim 1, wherein the movement data specify a rate of movement of the image longitudinally over the display area.

10. The method according to claim 1, wherein the movement data specify a size of the image relative to a size of the display area.

11. The method according to claim 1, wherein the image data comprises a plurality of independently controllable display items, each having a set of processable instructions associated therewith.

12. The method according to claim 11, wherein each set of instructions defines movement of a display item corresponding thereto relative to movement of the image.

13. The method according to claim 1, wherein the selected data are displayed for a specified duration determined by the visualization process.

14. The method according to claim 13, wherein the executable process is paused until receipt of data indicative of user interaction with the visualization process through the mobile terminal.

15. Data visualization apparatus for use in visualizing data on a mobile terminal arranged to perform the steps according to claim 1.

16. A non-transitory computer readable storage medium having stored thereon computer readable program code, which, when executed by a computer system, causes said computer system to perform the method according to claim 1.

17. The method according to claim 1, wherein the selected data comprise image and movement data specifying movement of an image with respect to the display area.

18. The method according to claim 1, wherein resuming execution of the executable process when the visualization request has been fulfilled comprises confirming completion of the visualization process, the mobile terminal application sending an instruction to the executable process, causing the executable process to resume whichever process step was paused to await the fulfillment of the visualization request.

19. The method according to claim 1, wherein the visualization process corresponds to the display of an advertisement on the mobile terminal.

* * * * *